United States Patent [19]
Jerabek

[11] 3,984,299
[45] Oct. 5, 1976

[54] PROCESS FOR ELECTRODEPOSITING CATIONIC COMPOSITIONS
[75] Inventor: Robert D. Jerabek, Glenshaw, Pa.
[73] Assignee: PPG Industries, Inc., Pittsburgh, Pa.
[22] Filed: Feb. 5, 1975
[21] Appl. No.: 547,327

Related U.S. Application Data
[63] Continuation-in-part of Ser. No. 193,590, Oct. 28, 1971, abandoned, which is a continuation-in-part of Ser. No. 47,917, June 19, 1970, Pat. No. 3,799,854.

[52] U.S. Cl. ............................................. 204/181
[51] Int. Cl.$^2$............................................. C25D 13/08
[58] Field of Search ................................... 204/181

[56] References Cited
UNITED STATES PATENTS

| | | |
|---|---|---|
| 3,617,367 | 11/1971 | Cummings ......................... 204/181 |
| 3,773,729 | 11/1973 | Wakimoto et al. ................. 204/181 |
| 3,804,786 | 4/1974 | Sekmakas ........................... 204/181 |

FOREIGN PATENTS OR APPLICATIONS

| | | |
|---|---|---|
| 679,761 | 2/1964 | Canada ............................... 204/181 |

*Primary Examiner*—Howard S. Williams
*Attorney, Agent, or Firm*—William J. Uhl

[57] ABSTRACT

It has been found that aqueous coating compositions comprising a blocked organic polyisocyanate, an amine adduct of an epoxy group-containing resin, and optionally a catalyst for urethane formation can be electrodeposited. These compositions deposit on the cathode to provide coatings having excellent properties.

11 Claims, No Drawings

PROCESS FOR ELECTRODEPOSITING CATIONIC COMPOSITIONS

CROSS-REFERENCE TO RELATED APPLICATIONS

This application is continuation-in-part of copending application Ser. No. 193,590 filed Oct. 28, 1971, now abandoned, which in turn is a continuation-in-part of application Ser. No. 47,917, filed June 19, 1970, now U.S. Pat. No. 3,799,854.

BACKGROUND OF THE INVENTION

Electrodeposition as a coating application method involves the deposition of a film-forming material under the influence of an applied electrical potential, and has become of increasing commercial importance. Along with the increased use of such methods has been the development of various compositions which provide more or less satisfactory coatings when applied in this manner. However, most conventional coating techniques do not produce commercially-usable coatings, and electrodeposition of many coating materials, even when otherwise successful, is often attended by various disadvantages such as non-uniform coatings and by poor throw power, i.e., the ability to coat areas of the electrode which are remote or shielded from the other electrode. In addition, the coatings obtained are in many instances deficient in certain properties essential for their utilization in certain applications for which electrodeposition is otherwise suited. In particular, properties such as corrosion resistance and alkali resistance are difficult to achieve with the resins conventionally employed in electrodeposition processes, and many electrodeposited coatings are subject to discoloration or staining because of chemical changes associated with electrolytic phenomena at the electrodes and with the types of resinous materials ordinarily utilized. This is especially true with the conventional resin vehicles used in electrodeposition processes which contain polycarboxylic acid resin neutralized with a base; these deposit on the anode and because of their acidic nature tend to be sensitive to common types of corrosive attack, e.g., by salt, alkali, etc. Further, anodic deposition tends to place the uncured coating in proximity to metal ions evolved at the anode, thereby causing staining with many coating systems.

DESCRIPTION OF THE INVENTION

It has now been found that aqueous coating compositions comprising a capped or blocked organic polyisocyanate, an amine adduct of an epoxy group-containing resin and optionally a catalyst for urethane formation may be electrodeposited on a cathode to produce coatings with highly desirable properties, including alkali resistance and corrosion resistance.

The capped or blocked isocyanate which may be employed in the compositions of the invention may be any isocyanate where the isocyanato groups have been reacted with a compound so that the resultant cappped isocyanate is stable to hydroxyl or amine groups at room temperature but reactive with hydroxyl or amine groups at elevated temperatures, usually between about 200° and about 600°F.

In the preparation of the blocked organic polyisocyanate, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidine and bitylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4''-triisocyanate, 1,3,5-triisocyanate benzene and 2,4,6-triisocyanate toluene; and the tetraisocyanates such as 4,4'-diphenyl-dimethyl methane-2,2',5,5'-tetraisocyanate; the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate-terminated prepolymers may be simple polyols such as glycols, e.g., ethylene glycol and propylene glycol, as well as other polyols such as glycerol, trimethylolpropane, hexanetriol, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, stryren oxide and the like. These are generally called hydroxy-terminated polyethers and can be liner or branched. Examples of polyethers include polyoxyethylene glycol having a molecular weight of 1540, polyoxypropylene glycol having a molecular weight of 1025, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic aromatic alkyl monoalcohol and phenolic compound may be used as a blocking agent in accordance with the present invention, such as for example, lower aliphatic alcohols, such as methyl, ethyl, chloroethyl, propyl, butyl, amyl, hexyl, heptyl, octyl, nonyl 3,3,5-trimethylhexanol, decyl and lauryl alcohols; and the like; the aromaticalkyl alcohols, such as phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, xylenol, nitrophenol, chlorophenol, ethyl phenol, t-butyl phenol and 2,5-di-t-butyl-4-hydroxy toluene. Minor amounts of even higher molecular weight, relatively nonvolatile monoalcohols may be used, if desired, to serve as plasticizers in the coatings provided by this invention.

Additional blocking agents include tertiary hydroxyl amines such as diethylethanolamine and oximes such as methylethyl ketone oxime, acetone oxime and cyclohexanone oxime. Use of oximes and phenols is particularly desirable because specific polyisocyanates blocked with these agents uncap at relatively low temperatures without the need for externally added urethane-forming catalyst such as tin catalyst described below.

The organic polyisocyanate-blocking agent adduct is formed by reacting a sufficient quantity of blocking agent with the organic polyisocyanate to insure that no free isocyanate groups are present.

As previously stated, the resin employed in the composition and method of this invention is a coating composition containing an aqueous dispersion prepared from a capped organic polyisocyanate and a resin which is an adduct of a primary and/or secondary amine with an epoxy group containing resin to form a room-temperature stable coating composition.

The epoxy material utilized to form the adduct can be any monomeric or polymeric compound or mixture of compounds having an average of one or more epoxy groups per molecule. The monoepoxides can be utilized but it is preferred that the epoxy compound be resinous and that the polyepoxide contain one or more epoxy groups per molecule. The epoxy can be essentially any of the well-known epoxides. A particularly useful class of polyepoxides are the polyglycidyl ethers, of polyphenols such as Bisphenol A. These can be produced, for example, by etherification of a polyphenol with epichlorohydrin or dichlorohydrin in the presence of an alkali. The phenolic compound may be, for example, bis(4-hydroxyphenyl) 2,2-propane, 4,4'-dihydroxybenzophenone, bis(4-hydroxyphenyl)1,1-ethane, bis(4-hydroxyphenyl)1,1-isobutane, bis(4-hydroxytertiarybutylphenyl)2,2-propane, bis(2-hydroxynaphthyl)methane, 1,5-dihydroxynaphthylene, or the like. In many instances it is desirable to employ such polyepoxides having somewhat higher molecular weight and containing aromatic groups. These can be provided by reacting the diglycidyl ether above with a polyphenol such as Bisphenol A and then further reacting this product with epichlorohydrin to produce a polyglycidyl ether. Preferably the polyglycidyl ether of a polyphenol contains free hydroxyl groups in addition to epoxide groups.

While the polygycidyl ethers of polyphenols may be employed per se, it is frequently desirable to react a portion of the reactive sites (hydroxyl or in some instances epoxy) with a modifying material to vary the film chracteristics of the resin. The esterification of epoxy resins with carboxylic acid, especially fatty acids is well known in the art and need not be discussed in detail. Especially preferred are saturated fatty acids and especially pelargonic acid. Likewise the epoxy resin may be modified with isocyanate group containing organic materials or other reactive organic materials.

Another quite useful class of polyepoxides are produced similarly from novolak resins or similar polyphenol resins.

Also suitable are the similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl)2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid, terephthalic acid, 2,6-naphthylane dicarboxylic acid, dimerized linolenic acid and the like. Examples are glycidyl adipate and glycidyl phthalate. Also useful are polyepoxides derived from the epoxidation of an olefinically unsaturated alicyclic compound. Included are diepoxides comprising in part one or more monoepoxides. These polyepoxides are non-phenolic and are obtained by the epoxidation of alicyclic olefins. For example, by oxygen and selected method catalysts, by perbenzoic acids, by acetaldehyde monoperacetate, or by peracetic acid. Among such polyepoxides are the epoxy alicyclic ethers and esters which are well-known in the art.

Other epoxy-containing compounds and resins include nitrogeneous diepoxides such as disclosed in U.S. Pat. No. 3,365,471; epoxy resins from 1,1-methylene bis(5-substituted hydantoin), U.S. Pat. No. 3,391,097; bis-imide containing diepoxides, U.S. Pat. No. 3,450,711, epoxylated ammomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

As previously set forth, the epoxy-containing materials are reacted with an amine to form an adduct. The amine employed may be any primary or secondary amine, preferably a secondary amine. Preferably the amine is a water soluble amino compound. Examples of such amines include mono- and dialkylamines such as methylamine, ethylamine, propylamine, butylamine, dimethylamine, diethylamine, dipropylamine, dibutylamine, methylbutylamine, and the like.

While in most instances reasonably low molecular weight amines may be employed, it is possible to employ higher molecular weight monoamines, especially where it is preferred that the molecule be flexibilized or further modified by the structure contributed by the amines. Likewise, a mixture of low molecular weight and high molecular weight amines may be employed to modify the resin properties.

Further, it is possible for the amines to contain other constituents so long as they do not interfere with the reaction of the amine and the epoxy group and are of the nature or employed under the conditions so that they do not gel the reaction mixture.

The reaction of the amine with the epoxy groupcontaining material takes place upon admixing the amine and the epoxy group-containing material. In fact, it may be exothermic. If desired, the reaction mixture, if necessary, may be heated to moderate temperature, that is, 50° to 150°C., although higher or lower temperatures may be used, depending on the desired reaction. It is frequently desirable, in any event, at the completion of the reaction to elevate the temperature at least slightly for a sufficient time to insure complete reaction.

The amount of amine reacted with the epoxy group-containing material is at least that amount sufficient to render the resin cationic in character, that is, transportable to the cathode when acid solubilized. In some instances, substially all of the epoxy groups in the resin are reacted with an amine. However excess epoxy groups may remain which hydrolyze upon contact with water to form hydroxyl groups.

The polyisocyanate-blocking agent adduct is preferably admixed with the amine epoxy adduct in rations of from about 0.5 to about 2.0 urethane groups for each hydroxyl group.

It is usually necessary, in order to insure rapid and complete reaction of the two components, to have present in the coating mixture a catalyst for urethane formation. However, if curing temperatures after deposition are high enough catalyst may not be needed. Also, if a proper blocking agent for the isocyanate is employed, e.g., oximes and phenols, catalysts may not be needed. Examples of externally added catalyst are the tin compounds such as dibutyl tin dilaurate and tin acetate are preferred but other catalysts for urethane formation known in the art may be employed. The amount of catalyst employed in that amount which effectively promotes reaction in the deposited film for example, amounts varying from about 0.5 percent to about 4 percent by weight of the amine-epoxy adduct may be employed. Typically about 2 percent by weight are employed.

The capped isocyanate/amine epoxy adduct catalyst mixture is electrodeposited on a suitable substrate and cured at elevated temperatures, such as from about 250° to about 600°F., the film curing at least in part through urethane crosslinks. The alcohol released may either volatilize or remain in the mixture as a plasticizer, depending essentially on its boiling point.

Aqueous compositions containing the above components are highly useful as coating compositions, particularly suited to application by electrodeposition although they may also be applied by conventional coating techniques. It is necessary to add a neutralizing agent to obtain a suitable aqueous composition. It is desirable to electrodeposit these coatings from a solution having a pH between 3 and about 9.

Neutralization of these products is accomplished by the reaction of all or part of the amino groups by a water solution acid, for example, formic acid, acetic acid, or phosphoric acid or the like. The extent of neutralization depends upon the particular resin and it is only necessary that sufficient acid be added to solubilize or disperse the resin.

Electrodepositable compositions, while referred to as "solubilized", in fact are considered a complex solution, dispersion or suspension, or a combination of one or more of these classes in water, which acts as an electrolyte under the influence of an electric current. While no doubt in some cases the resin is in solution, it is clear that in some instances and perhaps in most the resin is a dispersion which may be called a molecular dispersion of molecular size between a colloidal suspension and a true solution.

The concentration of the product in water depends upon the process parameters to be used and is in general not critical, but ordinarily the major proportion of the aqueous composition is water, e.g., the composition may contain one to 25 percent by weight of resin. In most instances, a pigment composition and, if desired, various additives such as anti-oxidants, surface-active agents, coupling solvents and the like known in the electrodeposition art are included. The pigment composition may be of any conventional type, comprising, for example, one or more pigments such as iron oxides, lead oxides, strontium chromate, carbon black, titanium dioxide, talc, barium sulfate, cadmium yellow, cadmium red, chromic yellow, or the like.

In electrodeposition processes employing the aqueous coating compositions described above, the aqueous composition is placed in contact with an electrically-conductive anode and an electrically-conductive cathode, with the surface to be coated being the cathode. Upon passage of electric current between the anode and the cathode, while the contact with the bath containing the coating composition, an adherent film of the coating composition is deposited on the cathode. This is in contrast to processes utilizing polycarboxylic acid resins which deposit on the anode, and many of the advantages described above are in large part attributed to the cathodic deposition.

The conditions under which the electrodeposition is carried out are in general similar to those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tends to decrease during electrodeposition.

The method of the invention is applicable to the coating of any electrically-conductive substrate, and especially metals such as steel, aluminum, copper or the like.

After deposition, the coating is cured at elevated temperatures by any convenient method such as in baking ovens or with banks of infrared heat lamps. Curing temperatures are preferably from about 350° to about 425°F., although curing temperatures from about 250° to about 500° or even 600°F. may be employed, if desired.

Illustrating the invention are the following examples, which, however, are not to be construed as limiting the invention to their details. All parts and percentages in the examples, as well as throughout this specification, are by weight unless otherwise specified.

EXAMPLE A

A cationic pigment dispersant was prepared by heating 746.2 parts of stearyl glycidyl ether (Proctor & Gamble's Epoxide 45) and 224 parts of ethylene glycol monobutyl ether to about 50°C. and adding 150.2 parts of n-methyl ethanolamine over a 30-minute period with external cooling to keep the batch temperature below 100°C. When all the amine was added, the batch was held an additional hour at 100°C. before cooling and storage.

To prepare a grinding vehicle from this cationic pigment dispersant, 200 parts were blended with 38.5 parts of 88 percent lactic acid and 515 parts of deionized water.

To prepare a pigment paste, 90 parts of this grinding vehicle was blended with four parts of acetylenic alcohol defoamer (Surfynol 104-A), 60 parts of deionized water, and the resultant slurry ground in a suitable mill to a Hegman No. 7.

EXAMPLE I

An amine-epoxy adduct was prepared as follows:

One thousand parts of polyglycidyl ether of bisphenol A (Epon 1004) possessing an epoxide equivalent weight of 910 were dissolved in 277 parts of n-methyl pyrrolidone by heating to 70°C. with agitation. Diethylamine, 80.3 parts, essentially stoichiometrically equivalent to the epoxide groups present, were added and the batch heated to 100°C. where it was held for two hours, and then cooled for subsequent use. The product was identified as Adduct A.

In another reactor, a diurethane of 80/20 2,4/2,6-toluene diisocyanate was prepared by slowly adding 87.1 parts of 80/20 TDI to 143 parts (10 percent stoichiometric excess) of 2-ethylhexanol containing 1 drop of dibutyl tin diluarate catalyst with external cooling to maintain the reaction mixture below 100°C.

To prepare an electrodepositable thermosetting cationic urethane composition, 21.6 parts of the above hydroxyl-containing glycidyl ether amine adduct (Adduct A) was blended with 5 parts of the above TDI diurethane and 0.2 part dibutyl tin dilaurate.

After neutralization with 1.5 parts of glacial acetic acid and subsequent thinning to about 5 percent nonvolatile content with deionized water, a zinc phosphated steel panel was cathodically coated by this bath, using 250 volts for 2 minutes. The resultant panel, after curing for ten minutes 380°F. displayed a somewhat rough, but acetone resistant film of 5H pencil hardness.

EXAMPLE II

An amine-epoxy adduct was prepared as follows:

One thousand parts of polyglycidyl ether of bisphenol A (Epon 1004) were dissolved in 300 parts of toluene by heating to approximately 100°C. with agitation. After cooling under a dry nitrogen blanket 78.2 parts of diethylamine were introduced and the batch heated to 100°C. where it was held for 1½ hours. Toluene was then distilled off as the batch was raised to 125°C., at which time 188.1 parts of pelargonic acid were introduced. The batch was slowly heated to 200°C. under reflux conditions and the water of esterification removed in a decanting trap. After a total of about 5 hours heating, the acid value of the batch dropped to 1.5 mg. KOH/gm. of sample, and the batch was sparged 15 minutes at 200°C. with inert gas and cooled. The product was identified as Adduct B.

In another reactor, a fully blocked diurethane of 80/20 2,4/2,6-toluene diisocyanate mixture was prepared by slowly adding 87.1 parts of 80/20 toluene diisocyanate to 142 parts of 2-ethylhexanol containing 1 drop of dibutyl tin dilaurate with external cooling to maintain the reaction mixture below 100°C.

To prepare an electrodepositable thermosetting cationic urethane composition, 20 parts of the above pelargonic ester (Adduct B) was dissolved in a mixture of 5 parts isopropanol and 2 parts ethylene glycol monobutyl ether, blended with ten parts of the above diurethane 80.20 TDI, followed by 0.4 parts of dibutyl tin dilaurate and then 3.0 parts of 50 percent non-volatile aqueous gluconic acid solution. The resultant mixture was reduced to approximately 5 percent solids by slowly adding 360 parts of deionized water to form an electrodeposition bath. When electrodeposited upon a zinc phosphated steel panel for 90 seconds at 350 volts, the resultant smooth film after curing 25 minutes at 350°F. showed a 2H pencil hardness and was resistant to attack from acetone.

EXAMPLE III

An amine-epoxy adduct was prepared as follows:

One thousand eight hundred thirty parts (2 equivalents) of polyglycidyl ether of bisphenol A (Epon 1004) possessing an epoxy equivalent weight of 915 were dissolved in 353.2 parts of methyl butyl ketone by heating to reflux at 130°C. with agitation in order to remove any water product by use of a decanting trap in the distillate return line. Upon cooling to 80°C. under a dry nitrogen blanket, 52 parts (0.1 equivalent) of the diketimine derived from one mole of diethylene triamine and 2 moles of methyl isobutyl ketone (1.9 equivalency) (as described in U.S. Pat. No. 3,523,925) and 138.8 parts diethylamine were added and the batch heated to 120°C. where it was held approximately 2 hours and then thinned with 326 parts of propylene glycol monomethyl ether. The resultant polytertiary amine cationic resin containing potential primary amine groups (to be generated from the ketimine moiety upon water addition) was stored for subsequent use. This product was identified as Adduct C.

In order to prepare a reactive cationic plasticizer, the 2-ethylhexanol monourethane of 2,4-toluene diisocyanate was first prepared by adding 1953 parts of 2-ethylhexanol to 2610 parts of 2,4-toluene diisocyanate and 200 parts methyl butyl ketone over a 5 hour period with agitation and external cooling to maintain the batch reaction temperature below 20°C. The batch was then thinned with 100 parts of methylbutyl ketone and stored under dry nitrogen.

In another reactor, 456 parts of the above 2-ethylhexanol monourethane of 2,4-TDI (1.5 equivalents of free isocyanate) was added to 769.5 parts (1.5 equivalents) of polyoxypropylene diamine (Jefferson JEFFAMINE D-1000) possessing an amine equivalent weight of 512 over a 20 minute period at 40°C., and then thinned with 189 parts of methylbutyl ketone to yield a reactive cationic plasticizer of 85.2 percent non-volatile content.

In another reactor, the 2-ethylhexanol diurethane of 80/20 2,4/2,6-toluene diisocyanate was prepared by slowly adding 87.1 parts of 80/20 2,4-2,6-TDI to 143 parts of 2-ethylhexanol containing one drop of dibutyl tin dilaurate with external cooling to maintain the reaction mixture below 100°C.

To prepare an electrodepositable thermosetting cationic urethane composition, 741 parts of the above polytertiary amine cationic resin (Adduct C), 57 parts of ethylene glycol monohexyl ether, 134 parts of the above reactive cationic plasticizer, 231 parts of the above 2-ethylhexanol diurethane and 18 parts dibutyl tin dilaurate catalyst were blended and then solubilized with 46 parts 88 percent lactic acid and 1773 parts deionized water.

To pigment this composition, 1216 parts of it were blended with 247 parts of the pigment paste described in Example A, and the batch thinned to about 12 percent non-volatile content with 2337 parts of deionized water.

This electrodeposition bath showed a pH of 6.0 and 2 minute throwpower of 10 inches at 280 volts. Films deposited cathodically for two minutes at 280 volts on zinc phosphated steel and baked 45 minutes at 350°F. yielded smooth, hard, flexible films of 0.5 mil thickness.

EXAMPLE IV

Into a suitable reactor were charged 805 parts by weight of a polyglycidyl ether derived from the condensation of Bisphenol A and epichlorohydrin possessing an epoxy equivalent of about 198 (EPON 829), and 243 parts by weight of Bisphenol A. The charge was agitated and heated to exotherm. After 15 minutes at about 180°C., 265 parts by weight of a polycaprolactone diol sold commercially by Union Carbide Corporation under the trade name PCP 0200 and 39 parts by weight of xylol were added to the reaction mixture. The mixture was then reheated to reflux temperature and held 30 minutes to removed any water present. After cooling to 140°C., 385 parts by weight of benzyl dimethyl amine were added to the reaction mixture. The temperature of the reaction mixture was held at 130°C. for approximately 2½ hours.

To the reaction mixture was added 1003 parts by weight of a polyurethane crosslinker prepared as follows: 218 parts by weight of 2-ethylhexanol was added slowly to 291 parts of 80/20, 2,4/2,6-toluene diisocyanate in an agitated closed vessel under a dry nitrogen blanket with external cooling to keep the reaction mixture temperature under 100°F. The batch was held an additional ½ hour after all the 2-ethylhexanol was added and then heated to 140°F. at which point 75 parts of trimethylol propane was added, followed by 0.08 parts of dibutyltin dilaurate catalyst. After an initial exotherm, the bath was held at 250°F. for 1½ hours until essentially all of the isocyanate moiety was consumed as indicated by an infrared scan. The batch was then thinned with 249 parts of ethylene glycol monoethyl ether (CELLOSOLVE).

The reaction mixture was then cooled to 110°C. at which time 64 parts by weight of methyl ethanol amine and 40 parts by weight of 70 percent non-volatile solution of methyl isobutyl diketimine of diethylene triamine in methyl isobutyl ketone were added to the reaction mixture. The diketimine was derived from one mole of diethylene triamine and two moles of methyl isobutyl ketone as described in U.S. Pat. No. 3,523,925.

After the addition of the diketimine and the methylethanolamine, the reaction mixture was held for 1 hour at 115°C. after which time the reaction mixture was thinned by adding 208 parts by weight of ethylene glycol monohexyl ether. The reaction mixture was held for another hour at 115°C. after which time 2350 parts by weight of it was charged to another reactor and blended with a mixture of 25 parts by weight of glacial acetic acid, 18.3 parts by weight of an acetylenic alcohol SURFYNOL 104 A registered trademark of Air Products and Chemicals, Inc. which is a 45.8 parts by weight of a special cationic dispersant described below and 2144 parts by weight of deionized water.

The special cationic dispersant was prepared by blending 761 parts of an alkyl imidazoline commercially available from Geigy Industrial Chemicals as GEIGY AMINE C, 171 parts by weight of glacial acetic acid, 761 parts by weight of ethylene glycol monobutyl ether and 2109 parts by weight of deionized water.

To prepare an electrodepositable thermosetting cationic urethane composition, 900 parts by weight of the above-described composition was blended with 2700 parts by weight of deionized water. The solution had a solids content of about 10 percent. A zinc phosphated steel panel was cathodically coated by this bath using 170 volts for two minutes. The resultant panel, after curing, for 5 minutes at 500°F. in an oven gave a glossy, hard, tough, acetone-resistant film of 0.5 mil thickness.

EXAMPLE V

A polyglycidyl ether-amine adduct was prepared as follows:

Into a suitable reactor were charged 105 parts by weight of a polyglycidyl ether derived from the condensation of Bisphenol A and epichlorohydrin, possessing an epoxy equivalent weight of about 198 (EPON 829) and 28 parts by weight of Bisphenol A. The charge was agitated and heated to an exotherm at 280°F. and allowed to exotherm freely for about ½ hour to remove water, the top temperature reaching 350°F. The mixture was then cooled to 250°F. and 119.7 parts by weight of aketimine, derived from 1 equivalent of N-cocotrimethylene diamine (DUOMEEN CD commercially available from Armour Industrial Chemical Co.) and one equivalent of methyl normal butyl ketone, was charged to the reaction vessel.

After the ketimine was added to the reaction mixture, the mixture was heated to 285°F. and held at this temperature for 2 hours. The reaction mixture was then cooled to 270°F. and 43.7 parts by weight of ethylene glycol monoethyl ether was added to the reaction mixture.

In another reactor, a triurethane of a trifunctional aliphatic isocyanate commercially available from Mobay Chemical Company under the trademark DESMODUR N-100 capped with methylethyl ketoxime was prepared as follows: 3550 parts by weight of the trifunctional aliphatic isocyanate and 1182.5 parts by weight of methyl normal butyl ketone were charged to the reactor. 1815 parts by weight of the methylethyl ketoxime was slowly added to the triisocyanate with cooling, keeping the reaction temperature below 40°C. Addition took about 1½ hours. The cooling was removed and the batch held until an infrared analysis indicated that the reaction mixture was free of unreacted NCO groups.

To prepare an electrodepositable thermosetting resin cationic urethane composition, 226 parts of the above-described polyglycidyl ether amine adduct was blended with 157 parts by weight of the above ketoxime blocked polyisocyanate. The mixture was neutralized with 19.7 grams of glacial acidic acid.

A pigment paste was prepared by blending together 202 parts of the above-described polyglycidyl ether amine adduct, 98 parts by weight of methylethyl ketone, 194 parts by weight of $TiO_2$, 1.9 parts by weight of carbon black, 50.1 parts by weight of clay, 36 parts by weight of lead silicate and 18 parts by weight of strontium chromate. The resultant blend was ground in a suitable mill to a Hegman No. 7 particle size. Two hundred twenty-eight parts by weight of the pigment paste was then combined with the cationic urethane composition prepared as described above and with 929 parts by weight of deionized water in a Cowles mixer, after which the mixture was thinned with 2200 parts by weight of deionized water to form a 13 percent solids solution having a pH of 6.5. A zinc phosphated steel panel was cathodically coated by this bath, the bath being at room temperature, using 100 volts for 2 minutes. The resultant panel, after curing for 20 minutes at 325°F., displayed a smooth, acetone-resistant film.

In the manner of the above examples, various other amine epoxy adducts, capped polyisocyanates, catalysts and conditions within the scope of the description above may be substituted to achieve similar results.

According to the provisions of the Patent Statutes, there are described above the invention and what are now considered its best embodiments; however, within the scope of the appended claims, it is understood that the invention can be practiced otherwise than as specifically described.

I claim:

1. In a method of electrocoating an electrically-conductive surface serving as a cathode which comprises passing electric current between said cathode and an anode in contact with an aqueous electrodepositable composition,
the improvement wherein said electrodepositable composition comprises:
A. a hydroxyl-containing adduct which is the reaction product of a primary or secondary amine and a polyepoxide, said adduct being solubilized with acid to provide cationic groups in said adduct,
B. a blocked organic polyisocyanate stable at room temperature in the presence of hydroxyl or amino groups but reactive with hydroxyl or amino groups at elevated temperatures.

2. A method according to claim 1 wherein (B) is the reaction product of an organic polyisocyanate and a compound selected from the group consisting of an aliphatic alkyl monoalcohol, a cycloaliphatic alkyl monoalcohol, an aromatic alkyl monoalcohol, a ketoxime, and a tertiary hydroxylamine.

3. A method according to claim 1 wherein B is the reaction product of an organic polyisocyanate and an aliphatic alkyl monoalcohol.

4. A method according to claim 1 wherein (A) and (B) are present in a ratio of about 0.5 to about 2.0 blocked isocyanate groups per hydroxyl group.

5. A method according to claim 1 wherein (A) is an acid-solubilized adduct of a primary or secondary amine and a polyglycidyl ether of a polyphenol.

6. A method according to claim 5 wherein (B) is the reaction product of an organic polyisocyanate and a compound selected from the group consisting of an aliphatic alkyl monoalcohol, a cycloaliphatic alkyl monoalcohol, an aromatic alkyl monoalcohol, a phenol, a ketoxime, and a tertiary hydroxylamine.

7. A method according to claim 5 wherein (A) and (B) are present in a ratio of about 0.5 to about 2.0 blocked isocyanate groups per hydroxyl group.

8. A method according to claim 1 wherein (A) is an acid-solubilized adduct of a secondary amine and a polyglycidyl ether of Bisphenol A.

9. A method according to claim 8 wherein (B) is the reaction product of an organic polyisocyanate and a compound selected from the group consisting of an aliphatic alkyl monoalcohol, a cycloaliphatic alkyl monoalcohol, an aromatic alkyl monoalcohol, a phenol, a ketoxime, and a tertiary hydroxylamine.

10. A method according to claim 1 wherein (A) is an acid-solubilized adduct of a secondary amine and a carboxylic acid-modified, epoxy group-containing polyglycidyl ether of a polyphenol.

11. An article electrocoated by the method of claim 1.

* * * * *

UNITED STATES PATENT AND TRADEMARK OFFICE
CERTIFICATE OF CORRECTION

PATENT NO. : 3,984,299

DATED : October 5, 1976

INVENTOR(S) : Robert D. Jerabek

It is certified that error appears in the above-identified patent and that said Letters Patent are hereby corrected as shown below:

Column 2, line 35, "liner" should be --linear--.

Column 4, line 68, "substially" should be --substantially--.

Column 5, line 5, "rations" should be --ratios--.

Column 9, line 5, "removed" should be --remove--.

Column 10, line 34, "226" should be --266--.

Signed and Sealed this

Twenty-first Day of December 1976

[SEAL]

Attest:

RUTH C. MASON
*Attesting Officer*

C. MARSHALL DANN
*Commissioner of Patents and Trademarks*